United States Patent [19]

Price

[11] Patent Number: 5,033,591

[45] Date of Patent: Jul. 23, 1991

[54] DISC BRAKES FOR VEHICLES

[75] Inventor: Anthony G. Price, Gwent, Great Britain

[73] Assignee: Lucas Industries Public Ltd. Co., Birmingham, England

[21] Appl. No.: 487,246

[22] Filed: Mar. 1, 1990

[30] Foreign Application Priority Data

Mar. 2, 1989 [GB] United Kingdom ............... 8904852

[51] Int. Cl.$^5$ ........................................... F16D 55/04
[52] U.S. Cl. ................................. 188/71.4; 188/72.7; 188/106 F
[58] Field of Search ..................... 188/71.3, 71.4, 72.2, 188/72.7, 106 F, 18 A, 72.6, 71.1, 106 A, 106 P, 369, 368, 367, 366, 72.5; 192/70, 93 A, 93 R, 93 C, 70.23, 70.24

[56] References Cited

U.S. PATENT DOCUMENTS

| | | | |
|---|---|---|---|
| 2,219,792 | 10/1940 | Rasmussen et al. | 188/71.4 |
| 3,734,242 | 5/1973 | Klaue | 188/71.4 |
| 3,899,051 | 8/1975 | Grosseau | 188/106 F X |
| 4,358,002 | 11/1982 | Price et al. | 188/71.4 X |
| 4,550,810 | 11/1985 | Price et al. | 188/71.4 |
| 4,685,541 | 8/1987 | Price et al. | 188/71.4 |
| 4,736,820 | 4/1988 | Price et al. | 188/71.4 |
| 4,795,003 | 1/1989 | Colgate | 188/71.4 |
| 4,800,993 | 1/1989 | Weber | 188/106 F X |

*Primary Examiner*—Douglas C. Butler
*Attorney, Agent, or Firm*—Renner, Kenner, Greive, Bobak, Taylor & Weber

[57] ABSTRACT

A compound disc brake comprises a pair of pressure plates with a ball and ramp camming mechanism, one of the plates comprises a driven plate keyed to a rotating axle shaft to be braked, and the other plate comprises a servo plate carried from the driven plate by the camming mechanism. The servo plate has a torque-transmitting structure in the form of a separate annular disc keyed to the outer peripheral edge of the servo plate. The torque-transmitting structure transmits torque applied to that region by a primary braking apparatus to the central region of the servo plate. Retardation of the servo plate by the primary braking apparatus causes the pressure plates to separate axially and move into engagement with relatively stationary braking surfaces in the brake housing whereafter servo braking occurs. The brake includes a mechanically operable parking brake which acts on the torque-transmitting structure and comprises an annular ring concentric with the shaft and having camming elements to produce axial movement when it is moved angularly by an arm extending through a circumferential slot. The annular ring of the parking brake may comprise a hydraulic annular piston which is also used for normal service braking, or may be a separate ring.

15 Claims, 3 Drawing Sheets

DISC BRAKES FOR VEHICLES

This invention relates to disc brakes for vehicles, and, more precisely, to parking brake assemblies for such brakes.

A known kind of disc brake for a vehicle comprises a pair of pressure plates located between axially spaced braking surfaces provided in a housing and having self-energising camming means provided between the plates in the form of balls or rollers received in co-operating oppositely inclined angularly spaced recesses provided in adjacent faces of the pressure plates, relative angular movement between the plates causing the plates to move axially apart and into engagement with rotatable friction braking members keyed to an axle to be braked due to the balls or rollers riding up ramps defined by the recesses, the pressure plates thereafter urging the rotating braking members into engagement with the braking surfaces and being carried around with the rotatable friction braking members until a lug on one of the plates contacts a drag-taking stop abutment provided on the housing, whereafter continued rotation of the other plate forces the pressure plates apart with a self-energising action.

It is known for such a brake to be actuated by a hydraulic actuator for normal service braking, and by a mechanical actuator for parking braking, or in an emergency. A common form of parking brake comprises a pull-rod which acts on the outer ends of toggle links the inner ends of which are connected to respective lugs on the pressure plates, radial movement of the pull-rod causing circumferential movement of the pressure plates to expand the pressure plates and apply the brake.

The aim of the present invention is to provide an alternative form of parking brake.

According to the invention a disc brake for a vehicle comprises a housing in which is provided first and second relatively stationary braking surfaces and a rotatable braking member connected to a shaft to be braked and having first and second surface regions, service brake-applying means adapted to cause the first surface region to be urged against the first braking surface so as to retard the rotatable braking member to brake the shaft, and parking brake-applying means adapted to urge the second surface region against the second braking surface to apply a braking force to the second surface region, the first surface region and the first braking surface being at a radially inner location in comparison with the radial location of the second surface region and the second braking surface, and the parking brake-applying means incorporating a clamping member which is adapted to apply an axial force in the plan projection of the second surface region.

The first surface region may be provided on or adjacent a pressure plate.

A parking brake which is applied mechanically at a region radially outside of the first braking surface and first surface region which are operable during normal service braking is suitable for applications where the conventional toggle link arrangement described above is inappropriate.

The rotatable braking member may be keyed directly to the shaft, or may be connected to it indirectly via another member keyed to the shaft. The rotatable braking member may be connected to said other member by camming means.

Preferably the brake comprises a pair of pressure plates provided with camming means therebetween, and the second surface region and second braking surface are provided radially outside of the outer peripheral edge of at least one of the pressure plates.

The surface region may be provided on a friction disc which is adapted to be urged against the first braking surface by a pressure plate, the second surface region being radially outside of the peripheral edge of the pressure plate.

The clamping member may comprise an annular ring concentric with the shaft to be braked. The clamping member may have camming means adapted to produce an axial component of movement of the clamping member when the clamping member is moved circumferentially. The camming means of the clamping member may comprise balls or rollers received in complementary recesses in the clamping member and a reaction member. The reaction member may comprise an annular spacer unit clamped between a housing casing and an end-wall of the housing.

The clamping member may have an arm projecting radially through a circumferentially extending slot in the spacer unit or housing, movement of the arm in a circumferential direction initiating application of the parking brake.

In the preferred embodiments the rotating braking member comprises the servo plate and the second surface region is provided on the torque-transmitting means, which may be an integral part of the servo plate or may be a separate component angularly rigid with the servo plate.

In the preferred embodiments the primary brake may comprise an annular piston The clamping member of the parking brake may comprise a separate annular ring member, for example disposed outside of the annular piston, or the clamping member may comprise the annular piston itself. The annular piston may define a pressure space in combination with an annular groove in the housing, or spacer unit, with mechanical camming means being provided in the pressure space for manual application of the parking brake. Such mechanical camming means may comprise a ball-in-pocket arrangement. When the annular ring is provided outside of the annular piston, or other service braking means, the torque-transmitting means may comprise two separate plates keyed together for relative axial movement, the annular ring acting on the outer of the plates and the service braking means on the inner.

In another embodiment of the invention the clamping member of the parking brake may be provided at a radial position disposed inside the radial position of the primary brake. The primary brake may comprise an annular piston having a radial aperture through which a component of the parking brake assembly extends.

Embodiments of the invention will now be described by way of example only, with reference to the accompanying drawings of which:

Figure 1:
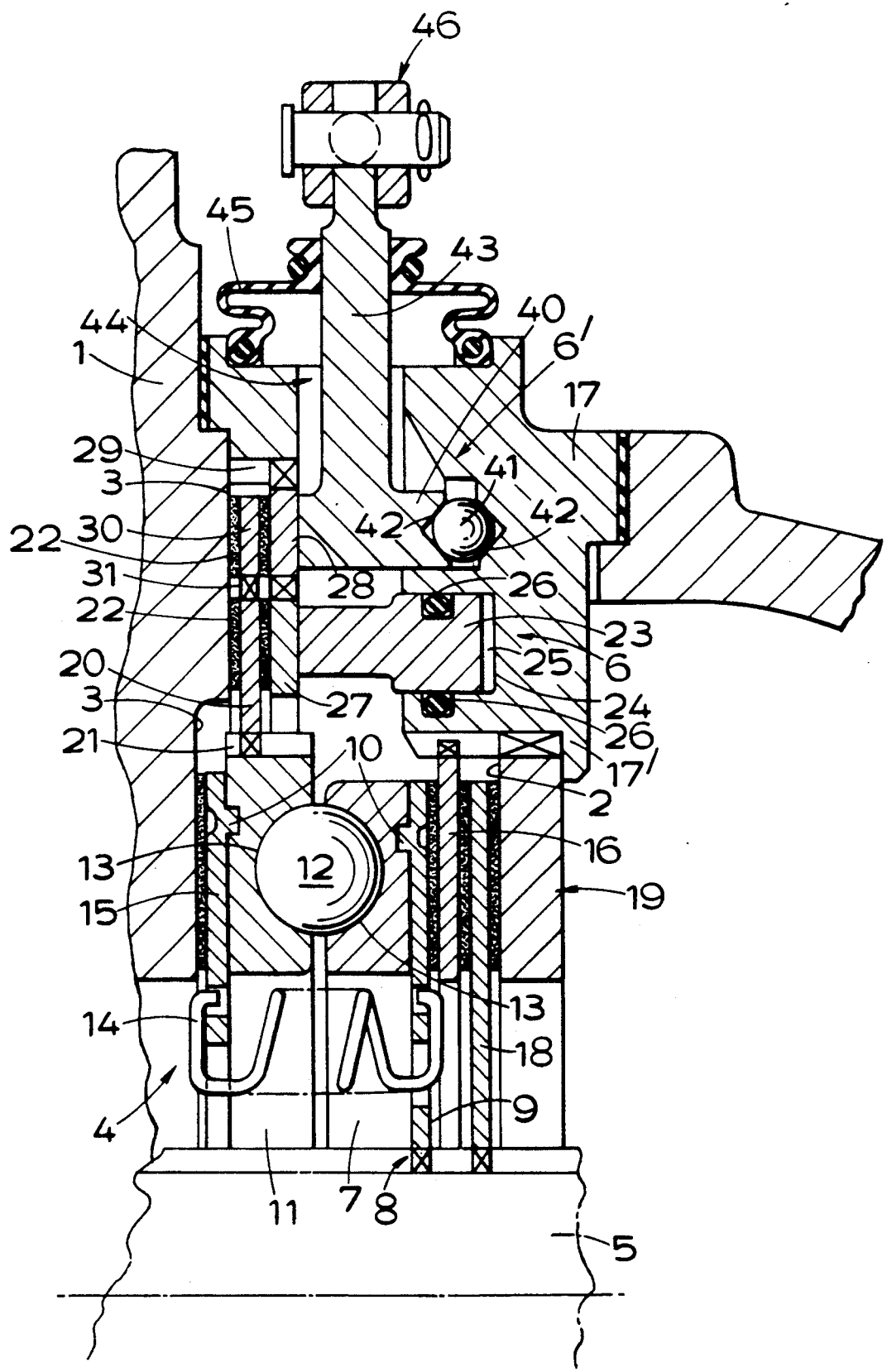
FIG. 1 illustrates a disc brake in accordance with the invention.

The brake illustrated in FIG. 1 of the drawings comprises a housing 1 having opposed annular radial braking surfaces 2 and 3, a pressure plate assembly 4 located between the braking surfaces and adapted to brake a rotating axle shaft 5, and primary braking means 6 to initiate brake actuation.

The pressure plate assembly 4 comprises a driven plate 7 keyed to the axle shaft 5 through splines 8 provided on a surface plate 9 rigidly secured to the pressure plate 7 via angularly spaced punched projections 10 which are received in complementary holes in the plate 7. A servo plate 11 is carried from the driven plate 7 via a series of balls 12 which are received in pairs of cooperating angularly spaced recesses 13 provided in the adjacent faces of the pressure plates. The recesses 13 have ramps arranged to provide a self-energising action for both directions of rotation of the shaft 5. Brake release springs 14 are provided to urge the pressure plates towards each other. The servo plate 11 is spaced from the shaft 5 and does not touch it directly. Servo plate 11 also has a surface plate, plate 15, secured to it via angularly spaced projections 10. The plate 15 comprises a first surface region. Each of the surface plates has an annular lining of friction material for engagement with their respective braking surface. The braking surface which plate 9 contacts is provided on an annular relatively stationary braking member 16 key to an annular spacer insert 17 which forms part of the housing.

A rotatable friction disc 18 is keyed to the shaft 5 and is disposed between the member 16 and a relatively thick end plate 19 which is keyed to the insert 17 and abuts against a flange 17' to define braking surface 2. The flange 17' could be a series of angularly spaced lugs.

The pressure plates comprise a secondary brake which applies itself when the primary braking means 6 is actuated during normal service braking, or when parking brake 6' is actuated for parking.

The servo plate 11 effectively is of significantly larger diameter than the driven plate 7 and projects radially beyond the outer peripheral edge of the driven plate. This is achieved by the provision of annular torque-transmitting member 20 keyed by splines 21 to the outer annular edge of pressure plate 11. The torque-transmitting member 20 has linings of friction material 22. The annular torque-transmitting member is radially beyond the peripheral edge of the driven plate and serves to transmit a retarding torque to the central part of the servo plate which has the recesses 13.

The primary braking means 6 comprises an annular piston 23 working in a complementary groove 24 in the spacer insert 17, hydraulic fluid being transmitted to working space 25 defined between the piston 23 and groove 24. Annular seals 26 seal the piston 23. The piston 23 does not act directly on the torque-transmitting member 20, instead an annular intermediate plate 27 is interposed between them. The intermediate plate 27 is supported in position by an annular continuation plate 28 which is keyed at its inner peripheral edge to the intermediate plate 27 and keyed at its outer peripheral edge to splines 29 provided on the spacer insert 17. Thus the intermediate plate 27 and continuation plate 28 are both relatively stationary plates angularly rigid with the housing.

An annular continuation ring 30 surrounds the torque-transmitting member 20 and is keyed to its outer peripheral edge via complementary splines 31. The continuation ring 30 also has friction linings 22. The continuation ring 30 is angularly rigid with the torque-transmitting member 20 and is disposed between the continuation plate 28 and a braking surface of the housing. Parking brake 6' acts on the continuation plate 28. The continuation ring 30 comprises a second surface region.

The parking brake 6' comprises an annular ring 40 disposed between the relatively stationary continuation plate 28 and a radial wall of the spacer insert 17. Camming means is provided between the ring 40 and the radial wall of the spacer in the form of balls 41 received in a series of angularly spaced opposed complementary recesses 42 provided in the ring 40 and spacer 17. The recesses are of helical form with a drill-point seat (so as to provide a space for dust and debris) and have a non-servo action.

Figure 3:
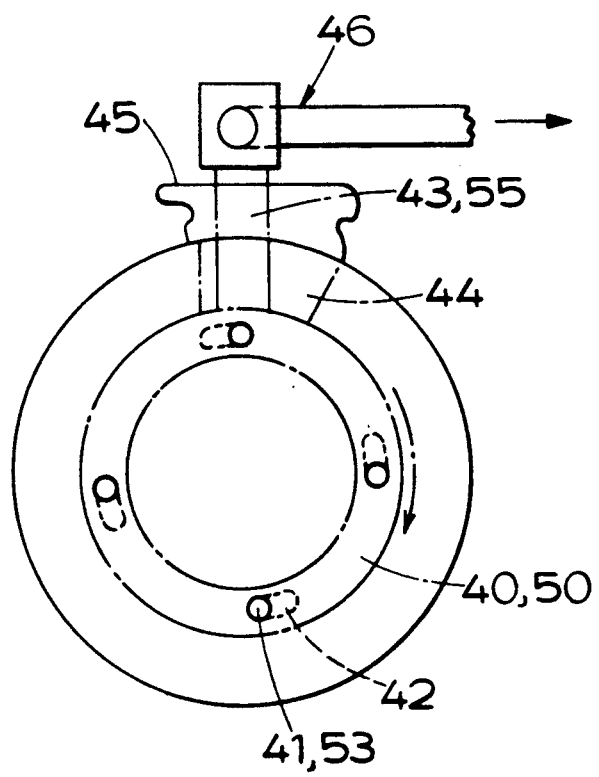
FIG. 3 is a schematic plan view of the brakes of FIGS. 1 and 2.

An actuating arm 43 extends radially outwards from the ring 40 and projects through a circumferentially extending slot 44 provided in the spacer 17. A flexible boot 45 seals the slot 44 and arm 43. An actuating linkage 46 is connected to the arm 43. FIG. 3 schematically illustrates some of the features of the parking brake 6'.

To initiate brake actuation for service braking the primary braking means 6 is actuated to urge the piston 23 and intermediate plate 27 against the friction lining 22 of the torque-transmitting means 20. This retards the rotation of the servo plate 11. The driven plate 7 is carried around with the shaft 5. The resulting relative angular movement between the pressure plates causes the balls 12 to ride up the ramps of the recesses 13 so urging the servo plate and driven plate axially apart. The surface plates 15 and 16 are urged against the braking surface 3 and stationary braking member 16 which tends to further retard the servo plate, which tends to urge the balls even further up the ramps in a self-energising action. Thus the primary braking means causes the first surface region (plate 15) to be urged against a corresponding region of the housing.

The shaft 5 can only be braked by braking the driven plate 7 or friction discs 18, since the servo plate 11 does not touch the shaft. The driven plate 7 is braked in two ways: firstly by the torque transmitted to that plate from the servo plate via the engagement of the balls 12 with the recesses 13, and secondly by the engagement of the surface plate 9 of the driven plate with the stationary braking member 16. Thus the driven plate is braked both directly by the secondary brake through the engagement of the driven plate with the braking member 16, and indirectly through the braking of the servo plate The servo plate is of course braked by the braking surface 3 (secondary brake) and by the primary braking means 6 (primary brake).

The compound brake of FIG. 1 retains the "feel" characteristics in service braking of a non-servo brake to some extent, but also has the greater stopping power of a servo brake. The PV input is that necessary to generate the required torque of the primary braking means alone. (PV is the product of pressure and volume).

In the embodiments described the braking torque produced by the secondary brake is substantially proportional to the braking torque applied by the primary braking means. The braking torque of the secondary brake is significantly greater than the braking torque of the primary braking means.

Application of the parking brake 6' is effected by moving the actuating linkage 46 mechanically so as to move the arm 43 and hence the ring 40 in a circumferential direction. This causes the balls 41 to ride up the recesses 42 and so urge the ring 40 axially away from the spacer insert 17 towards the continuation plate 28. The continuation plate 28 is urged axially into engagement with the continuation ring 30 to press it against the housing and so apply the brake. If the vehicle begins to roll whilst the parking brake is applied the pressure plates 7 and 11 will be forced apart with a servo action to brake the shaft 5. Thus the vehicle will only be able to move slightly before the servo action takes effect.

In a modification of FIG. 1 the radial positions of the parking brake 6' and the primary brake means 6 are interchanged: the hydraulically operable primary brake means 6 being provided at a larger radius than the parking brake 6'. This can be achieved by providing a circumferentially or helically extending slot in the primary brake means (for example an annular piston), and having an arm similar to arm 43 extending through the slot. The slot could be inclined to planes perpendicular to the axial direction of the brake by an amount to complement the angle of inclination of the ramps of the camming means incorporated in the parking brake. A brake having the primary braking means at a larger radius than the parking brake could, of course, have its parking (or primary) brake actuated by any convenient means.

Figure 2:
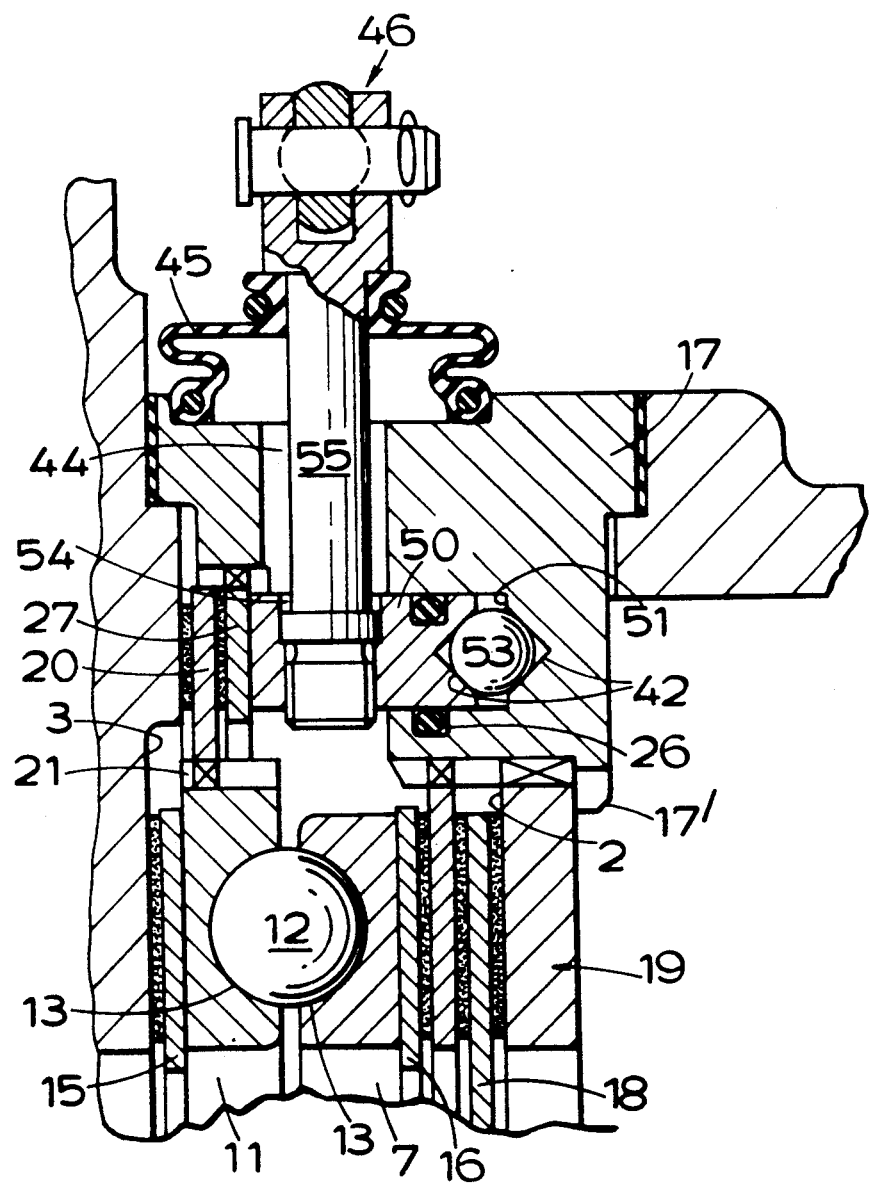
FIG. 2 illustrates a modified disc brake in accordance with the invention.

The embodiment of FIG. 2 is similar to that of FIG. 1, except that instead of having a separate parking brake 6' which acts on continuation plate 28 and continuation ring 30, it provides the parking brake as part of the annular piston assembly. Similar reference numerals have been used for similar structures, and FIG. 3 schematically illustrates some of its features. The main differences will be described below.

The hydraulic actuator of the embodiment of FIG. 2 comprises an annular piston 50 working in a complementary groove 51 in spacer insert 17. The opposed faces of the annular piston 50 and groove 51 have a series of pairs of angularly spaced opposed complementary recesses 42 in which balls 53 are located. The balls 53 lie in the working space of the hydraulic actuator. A radial bore 54 extends through the annular piston and is provided with a screw thread. Actuating arm 55 has a screw-threaded end by means of which it is secured rigidly to the annular piston 50. The arm 55 extends through circumferential slot 44 provided in spacer insert 17 and is sealed by flexible boot 45.

The annular piston 50 is adapted to bear against annular intermediate plate 27 keyed to the spacer 17. The intermediate plate 27 is adapted to bear against annular torque-transmitting member 20 which is keyed to the outer peripheral edge of the servo plate 11.

In normal service braking hydraulic pressure forces the annular piston into engagement with the intermediate plate 27 to urge the torque-transmitting member against the housing and so retard the servo plate. This initiates servo braking in a similar manner to the embodiment of FIG. 1.

Application of the parking brake is initiated by moving the arm 55 circumferentially in the slot 44 in order to move the annular piston 50 circumferentially. Circumferential movement of the piston 50 causes the balls 53 to ride up the ramps 42 and so urges the annular piston axially towards the torque-transmitting member 20 to apply the brake. The face of the annular piston 50 that is adjacent the intermediate plate 27 is coated with "Molycote" (TM) low-friction coating in order to facilitate the relative angular movement between the two components during application of the parking brake. Any means of providing low friction contact could be used, for example a ball-race.

Providing the parking brake as part of the hydraulic actuator makes the brake more compact, reduces the parts inventory needed to assemble the brake, and reduces the cost of the brake.

Although the actuating arms 43, 55 of the two embodiments are rigid with the parking brake clamping member which moves angularly to cause camming (ring 40 or piston 50), they need not be. A coupling to provide relative angular movement (pivoting) between the arm and the ring could be provided, or the ring or piston could be moved angularly for parking by any mechanical means, for example by a Bowden Cable.

I claim:

1. A disc brake for a vehicle comprising a housing in which is provided first and second relatively stationary braking surfaces, first and second pressure plates each having recesses in which rolling bodies are received, said rolling bodies and recesses comprising camming means adapted to cause axial separation of said pressure plates in response to relative angular movement therebetween, one of said pressure plates having a central portion and an annular projecting portion, the projecting portion being angularly rigid with said central portion and extending radially beyond the outer peripheral edge of the other of said plates, and said other of said plates being keyed to a shaft to be braked, a first surface region provided on said one pressure plate on said central portion provided radially inside of said projecting portion, a second surface region provided on said projecting portion, service brake-applying means adapted to cause said first surface region to be urged against said first braking surface so as to retard said one pressure plate and thereby, via said camming means, retard said other pressure plate to brake said shaft, and parking brake-applying means adapted to urge said second surface region against said second braking surface to apply a braking force to said second surface region, wherein said parking brake-applying means incorporates a clamping member which is adapted to apply an axial force in the plan projection of said second surface region.

2. A disc brake for a vehicle comprising a housing in which is provided first and second relatively stationary braking surfaces and a rotatable braking member connected to a shaft to be braked and having first and second surface regions, service brake-applying means adapted to cause said first surface region to be urged against said first braking surface so as to retard said rotatable braking member to brake said shaft, and parking brake-applying means adapted to urge said second surface region against said second braking surface to apply a braking force to said second surface region, wherein said first surface region and said first braking surface are at a radially inner location in comparison with the radial location of said second surface region and said second braking surface, said parking brake-applying means incorporating a clamping member which is adapted to apply an axial force in an axial, plane, projection of said second surface region, and wherein inner and outer annular plates are keyed together for relative axial movement and said service brake-applying means acts upon said inner ring and said parking brake-applying means acts upon said outer ring.

3. A disc brake according to claim 1, wherein said other pressure plate is connected to said shaft via another member keyed to said shaft.

4. A disc brake according to claim 1, wherein said clamping member comprises an annular ring concentric with said shaft to be braked.

5. A disc brake according to claim 1 or claim 2, wherein said clamping member has clamping camming means adapted to produce an axial component of movement of said clamping member when said clamping member is moved circumferentially.

6. A disc brake according to claim 5, characterised in that said clamping camming means comprise rolling bodies received in complementary recesses provided in said clamping member and a reaction member, said reaction member comprising an annular spacer unit clamped between a housing casing and an end wall of the housing.

7. A disc brake according to claim 6, wherein said clamping member has an arm projecting radially through a circumferentially extending slot in said spacer unit, movement of said arm in a circumferential direction initiating application of the brake for parking.

8. A disc brake according to claim 1, wherein said clamping member comprises an annular piston.

9. A disc brake according to claim 8, wherein said annular piston defines in part a pressure space to which hydraulic fluid is supplied, and mechanical camming means is provided in said pressure space.

10. A disc brake according to claim 1, wherein inner and outer annular plates are keyed together for relative axial movement and said service brake-applying means acts upon said inner ring and said parking brake-applying means acts upon said outer ring.

11. A disc brake according to claim 1, wherein said central portion of said one pressure plate comprises an inner ring having said first surface region and said projecting portion comprises a outer ring keyed to said inner ring so as to be axially slidable relative thereto, but circumferentially rigid thereto.

12. A disc brake according to claim 2, wherein said rotatable braking member is connected to said other member by camming means.

13. A disc brake according to claim 12, wherein said brake comprises a pair of pressure plates provided with camming means therebetween, and said second surface region and second braking surface are provided radially outside of the outer peripheral edge of at least one of said pressure plates.

14. A disc brake according to claim 13, wherein said first surface region is provided on a friction disc which is adapted to be urged against said first braking surface by a pressure plate, said second surface region being radially outside of the peripheral edge of said pressure plate.

15. A disc brake according to claim 2, wherein said rotating braking member comprises a self-energising, or servo, plate which co-operates via camming means with a driven plate keyed to said shaft, and said second surface region is provided on torque-transmitting means provided angularly rigid with said servo plate at a radial position radially outside of the outer peripheral edge of said driven plate.

* * * * *